United States Patent [19]
Cao et al.

[11] Patent Number: 5,840,638
[45] Date of Patent: Nov. 24, 1998

[54] PHOSPHATE GLASSES FOR RADIOACTIVE, HAZARDOUS AND MIXED WASTE IMMOBILIZATION

[75] Inventors: Hui Cao, Middle Island; Jay W. Adams, Stony Brook; Paul D. Kalb, Wading River, all of N.Y.

[73] Assignee: Brookhaven Science Associates, Upton, N.Y.

[21] Appl. No.: 772,982

[22] Filed: Dec. 23, 1996

[51] Int. Cl.[6] ............................................. C03C 3/17
[52] U.S. Cl. ............................... 501/48; 501/45; 588/11
[58] Field of Search ......................... 501/45, 48; 588/11

[56] References Cited

U.S. PATENT DOCUMENTS

| | | | |
|---|---|---|---|
| 3,746,556 | 7/1973 | Morgan | 501/48 |
| 4,139,909 | 2/1979 | Beall et al. | 365/125 |
| 4,351,749 | 9/1982 | Ropp | 588/11 |
| 4,455,384 | 6/1984 | Day et al. | 501/15 |
| 4,698,318 | 10/1987 | Vogel et al. | 501/10 |
| 4,847,008 | 7/1989 | Boatner et al. | 588/11 |
| 4,847,219 | 7/1989 | Boatner et al. | 501/27 |
| 5,043,369 | 8/1991 | Bahn et al. | 523/466 |
| 5,053,360 | 10/1991 | Myers et al. | 501/48 |
| 5,196,381 | 3/1993 | Hu et al. | 501/10 |
| 5,256,604 | 10/1993 | Aitken | 501/45 |
| 5,281,560 | 1/1994 | Francis et al. | 501/15 |
| 5,334,559 | 8/1994 | Hayden | 501/48 |
| 5,362,687 | 11/1994 | Tokunaga | 501/21 |
| 5,367,012 | 11/1994 | Aitken et al. | 523/451 |
| 5,461,185 | 10/1995 | Forsberg et al. | 588/11 |
| 5,529,960 | 6/1996 | Aitken et al. | 501/46 |
| 5,750,824 | 5/1998 | Day | 588/11 |

OTHER PUBLICATIONS

Wieners, et al. "Preliminary Assessment of Candidate Immobilization Technologies for Retrieved Single–Shell Tank Wastes", PNL–7918. (Jan. 1992).

Hayward, et al. Development of Sphene–Based Glass Ceramics Tailored for Canadian Waste Disposal Conditions, published in "Scientific Basis for Nuclear Waste Management", pp. 91–98. (1982 no month!.

Sales et al. "Physical and Chemical Characteristics of Lead–Iron Phosphate Nuclear Waste Glasses", *Journal of Non–Crystalline Solids,* 79, pp. 83–116. (1986) no month!.

Jantzen, et al. "Standard Test Methods For Determining chemical Durability of Nuclear Waste Glasses: The Product Consistency Test (PCT)" *Revised Submission to ASTM C26.13,* pp. 1–47. (Apr. 1993).

Hayward, "Review of Progress in the Development of Sphene–Based Glass–Ceramics", *Materials Research Society Symposia Proceedings* 50, pp. 355–362. (1985) no month!.

Dixon, et al. "The Canadian Nuclear Fuel Waste Management Program 1983 Annual Report", *Atomic Energy of Canada Limited,* Apr. 1984 — published date LMT.

Drager, et al. "Development of the Phosphate Glass Process for Ultimate Disposal of High–Level Radioactive Wastes", BNL 50130 (T–505) (Jan. 1968).

*Primary Examiner*—Karl Group
*Attorney, Agent, or Firm*—Margaret C. Bogosian

[57] ABSTRACT

Lead-free phosphate glass compositions are provided which can be used to immobilize low level and/or high level radioactive wastes in monolithic waste forms. The glass composition may also be used without waste contained therein. Lead-free phosphate glass compositions prepared at about 900° C. include mixtures from about 1 mole % to about 6 mole % iron (III) oxide, from about 1 mole % to about 6 mole % aluminum oxide, from about 15 mole % to about 20 mole % sodium oxide or potassium oxide, and from about 30 mole % to about 60 mole % phosphate. The invention also provides phosphate, lead-free glass ceramic glass compositions which are prepared from about 400° C. to about 450° C. and which includes from about 3 mole % to about 6 mole % sodium oxide, from about 20 mole % to about 50 mole % tin oxide, from about 30 mole % to about 70 mole % phosphate, from about 3 mole % to about 6 mole % aluminum oxide, from about 3 mole % to about 8 mole % silicon oxide, from about 0.5 mole % to about 2 mole % iron (III) oxide and from about 3 mole % to about 6 mole % potassium oxide. Method of making lead-free phosphate glasses are also provided.

3 Claims, 5 Drawing Sheets

PHOSPHATE GLASSES FOR RADIOACTIVE, HAZARDOUS AND MIXED WASTE IMMOBILIZATION

This invention was made with Government support under contract number DE-AC02-76CH00016, between the U.S. Department of Energy and Associated University, Inc. The Government has certain rights in the invention.

BACKGROUND OF THE INVENTION

The present invention relates to low temperature, lead-free, phosphate glass compositions which can be used to encapsulate and immobilize radioactive, hazardous and mixed wastes. Specifically, the present invention concerns the development of novel phosphate glass compositions having reduced processing temperatures and improved chemical durability when compared with existing conventional borosilicate and phosphate glass formulations. The new materials of the present invention have been developed primarily for use in vitrifying radioactive, hazardous and mixed wastes, but can also be used in other industrial glass applications.

Industrial, utility, military nuclear operations produce radioactive hazardous and mixed wastes which must be treated in an appropriate manner before disposal to prevent environmental contamination.

Vitrification has been selected for immobilization of high-level radioactive waste (HLW) because glass is highly stable, very durable and has the ability to incorporate a wide variety of chemical contaminants. However, requirements for storage and disposal of low-level radioactive (LLW) and mixed wastes differ from those for HLW. In addition, LLW and mixed waste contaminants have waste chemistries which can vary from those typically found in HLW. Thus, evaluation of vitrification or immobilization of these wastes must consider these differences.

In the past, most research on vitrification of mixed waste has focused on borosilicate glass formulations originally developed for HLW. Although borosilicate glass has demonstrated good long-term chemical durability and is both thermally and physically stable, it requires relatively high process temperatures (1200°–1500° C.) for effective encapsulation of waste. These high temperatures are a major drawback because of volatilization of certain isotopes such as $^{99}$Tc and $^{137}$Cs and heavy metals, such as Pb and Cd. To capture and stabilize the off-gas contaminants high temperature processes require the use of secondary treatment systems. Further, borosilicate glass processing is incompatible with even minor amounts (>1.5 mole %) of $P_2O_5$ in a waste stream. Insoluble phosphate phases form depending on the amount of CaO and rare earth oxides present. Further, wastes containing more than about 0.3 mole % $Cr_2O_3$, more than about 16 mole % $Al_2O_3$, or more than about 19 mole % $Fe_2O_3$ have also been flagged as outside the borosilicate glass concentration envelope. Therefore, alternative vitrification processes or products are desirable for improved treatment of these wastes.

In recent years, most research on low temperature glass processes focused on phosphate glass. Phosphate glasses are network-forming materials, structurally similar to silicate glasses, whose basic building blocks are $PO_4$ tetrahedra. Compared with silicate glasses, phosphate glasses offer significant advantages for waste vitrification, such as lower melting and softening temperatures and low melt viscosities. Use of phosphate glasses as final waste forms has been previously proposed, however interest in their development waned as durability of the glass matrix was found to be poor when compared with silicate glasses. Further, new process technologies and materials would have been required to handle their production.

Early work to develop phosphate glass as a nuclear waste form was pioneered at Brookhaven National Laboratory (BNL) under contract with the U.S. Atomic Energy Commission, beginning in the late 1950's and continuing through the late 1960's as described by Tuthill, et al. in "Development of the Phosphate Glass Process for Ultimate Disposal of High-Level Radioactive Wastes," BNL 50130 (T-505) (1968). Work at BNL focused on development of a continuous glass-melting process for the treatment of Purex-type wastes, nitric acid solutions of the fission products and residual salts from the extraction of uranium and plutonium, together with corrosion products. Development of the BNL process was carried out through pilot-scale testing using simulated waste solutions. A plant-scale demonstration using actual Purex HLW was conducted during the mid to late 1960's as part of the Waste Solidification Engineering Prototypes (WSEP) program at the Pacific Northwest Laboratory (PNL) as described by McElroy, et al., in "Evaluation of WSEP High-Level Waste Solidification Processes" Waste Solidification Program Summary Report, Vol. 11, BNWL-1667 (1972).

In the BNL process aqueous Purex wastes were evaporated, forming primarily nitrate salts of Fe, Na, Al, Cr, and Ni. $SiO_2$, $SO_4$, and $PO_4$ anions were also present in the waste, along with fission products, nominally in the concentration range of $10^{-3}$M. Good glass formation was reportedly observed at $P_2O_5$ compositions greater than 65 mole %, for the $Fe_2O_3$—$Na_2O$—$P_2O_5$ ternary system, and at greater than 70 mol % for the $Fe_2O_3$—$Al_2O_3$—$Na_2O$—$P_2O_5$ quaternary system. However, the $Fe_2O_3$-$Na_2O$-$P_2O_5$ system, all glasses with less than 60 mole % $P_2O_5$ devitrified. For the $Fe_2O_3$—$Al_2O_3$—$Na_2O$—$P_2O_5$ system, all glasses with less than 70 mole % $P_2O_5$ system, devitrified.

Glass formulations were melted at 1100°–1200° C., with temperatures reduced to 800°–900° C. during idling periods to prevent volatilization of phosphate. Metal ions were typically retained at more than 99.9% of their original amounts. Exceptions were ruthenium (94–99%) and cerium (99%), which appeared in the off-gas condensate, which was mainly $H_2SO_4$. The melt vessel was constructed of Inconel 702 with a Pt liner. Corrosion of the Pt liner was not a problem, although cracks did develop on several occasions, corroding the container. Inconel in contact with the molten phosphate reacted to form elemental phosphorus which, in turn, combined with Pt to form alloys with lower melting points.

In Europe, in another example of a waste solidification process, phosphate glasses were investigated for solidification and metal embedding of liquid radioactive wastes as described by Van Geel, et al. in "Solidification of High Level Liquid Waste to Phosphate Glass-Metal Matrix Blocks," IAEA-SM-207/83, Vol. 1, pp. 341–359, (1976). Glass was melted at about 1100° C. using a refractory lined melter with a liquid waste feed. Glasses were prepared as small beads to avoid devitrification problems. Low-alkali or alkali-free iron-aluminum phosphate glasses were found to have improved chemical durability, even better than that of borosilicate glasses. Soxhlet (dynamic) leachabilities were found to be about $5 \times 10^{-5}$ g/cm$^2$/d, although at temperatures above 100° C., leachability increased rapidly. Glasses were nominally 5 wt % $Al_2O_3$, 15 wt % $Fe_2O_3$, and 50 wt % $P_2O_5$, containing about 30 wt % waste oxides.

Lead-iron phosphate (LIP) glass nuclear waste forms were introduced and characterized in detail by Sales and Boatner in the mid 1980's. While lead phosphate glasses had been studied since the mid 1950's, their poor durability in water made them of little commercial interest. Vitrified waste forms containing iron oxide, however, were found to fare favorably compared with borosilicate glass waste forms, rekindling new interest in phosphate glass waste materials. LIP glasses could be processed at temperatures 100° C.–250° C. lower than borosilicate glasses using glass melting technology similar to that developed for borosilicate glasses. Solidified forms had dissolution rates in water about 1000 times lower than comparable borosilicate formulations, at 90° C. in solutions with a pH between 5 and 9.

The addition of iron to lead phosphate glass was found to dramatically increase chemical durability of the glass, by a factor of about $10^4$ for a 9 wt % iron oxide addition. Also, the tendency for the glass to crystallize on cooling or reheating was greatly suppressed. Without the iron modifier, lead metaphosphate glasses completely crystallized in air at 300° C. within a few hours. In contrast, LIP glasses were heated for several hundred hours at 500° C. without any signs of devitrification. A variety of metal oxide modifiers were investigated for similar effects (MgO, $Al_2O_3$, CaO, $Sc_2O_3$, $TiO_2$, $VO_2$, $Cr_2O_3$, $MnO_2$, CoO, NiO, $Cu_2O$, ZnO, $Ga_2O_3$, $Y_2O_3$, $ZrO_2$, $In_2O_3$, $La_2O_3$, $CeO_2$, and $Gd_2O_3$), although none were as effective. Compositional ranges for the three major components were: PbO (37–60 wt %), $Fe_2O_3$ (6–13 wt %), and $P_2O_5$ (32–44 wt %), where waste loadings ranged from 14–19 wt %. Practical concentration ranges for glass matrix formation were given to be: PbO (40–66 wt %), $Fe_2O_3$ (0–12 wt %), and $P_2O_5$ (30–60 wt %). Glasses were melted at temperatures between 900° and 1050° C.

Structure of LIP glass was characterized extensively, using Mossbauer spectroscopy, electron paramagnetic resonance, Raman and infrared spectroscopy, EXAFS (Extended X-ray Absorption Fine Structure), low-angle X-ray scattering, liquid chromatography, and transmission electron microscopy. For glasses prepared below 900° C., iron was incorporated in the glass as $Fe^{+3}$. Average polyphosphate chain length was reduced from more than 15 for iron-free glasses, to about 2.6 for glass with 9 wt % $Fe_2O_3$. Thus the improvement in durability was related to strengthened cross bonding between polyphosphate chains.

PNL conducted an evaluation of LIP glasses as part of the Second Generation HLW Technology Subtask of the Nuclear Waste Treatment Program. Their review found LIP glasses to have substantially better chemical durability than borosilicate glass, although severe devitrification (leading to reduced chemical durability) would result if glass waste forms were prepared in large canisters. A processing method would be required to rapidly cool the material to quench the vitreous structure. Similarly, LIP glasses were examined for their potential applicability for Savannah River Plant (SRP) waste. Phosphate glasses were found to be highly durable, however, the glass melts were highly corrosive with existing glass melting equipment. Thermal stability and waste component solubility were lower than for high-silica glasses. As a result, borosilicate glasses were found to be, overall, more favorable for SRP waste treatment.

Ultra low melting temperature lead-tin fluorophosphate glasses were investigated by Tick, P. A. in "Water Durable Glass with Ultra Low Melting Temperatures," Physics and Chemistry of Glass, Vol. 26, No. 6, pp. 149–154 (December 1984) showing glass transition temperatures of 75° C.–150° C. with good resistance to water attack. Reported compositional ranges investigated were 50–61 atomic percent (atomic %) Sn, 3.0–5.7 atomic % Pb, and 34–48 atomic % P, with fluorine and oxygen contents of 35–74 and 114–149 atoms per 100 cations, respectively. Glass melting was done in air at 450° C. Although lead additions had little effect on glass transition temperature, lead-tin phosphate glasses were readily devitrified without lead as glass component, suggesting that lead has a significant effect on the bonding character in the glass. With regard to chemical durability, four distinct corrosion behaviors were noted for the glass formulations tested, corresponding to very high (>10 mg/cm² day) to relatively low (<0.1 mg/cm² day) dissolution rates. Best durability was associated with the compositional window defined by 8<Sn/Pb<13 and 1<Sn/P<2, with F/Sn=1±0.2. Outside this region, phase separation was suspected, producing swelling or accelerated dissolution. There are no reports about their chemical stability in acid or basic solutions so far.

Few recent advances in phosphate glass waste forms have been reported as current interest seems to be focused on phosphate glass laser development and associated optical and electronic characterization. Structure models continue to be updated, using high performance liquid chromatography and x-ray spectrometry to analyze glass samples. Chemical durability improvements in alkali phosphate glasses were proposed in a patent application by Day and Wilder in "Chemically Durable Phosphate Glasses and a Method for Their Preparation; Patent Application," Department of Energy, Washington, D.C., PAT-APPL-6-447 847, 1982. Glasses containing 10–60 mole % of $Li_2O$, $Na_2O$, or $K_2O$; 5–40 mole % of BaO or CaO; 0–10 mole % of $Al_2O_3$; and 40–70 mole % of $P_2O_5$ were improved by incorporating up to 23 wt % of nitrogen. Nitrides were the favored additives.

Other phosphate containing formulations proposed for nuclear waste immobilization have been glass ceramics. Certain glass-ceramics or glass-composites may possess higher chemical durabilities than single phase glasses with respect to dissolution in water or corrosion resistance in harsh environments. Glass-ceramics or glass-composites may be formulated for vitrification, consisting of a major, thermodynamically stable crystalline phase and a relatively durable, vitreous matrix.

Various combinations of phosphate glass-ceramic matrices have been manufactured at research level. For example, new castable glass-ceramic dental materials have the potential for use in many phases of restorative dentistry. U.S. Pat. Nos. 3,732,087 and 4,431,420 disclose work which been carried out at Corning Glass Works on glass-ceramics based on crystallization of the parent glass. Bio-compatible calcium phosphate glass-ceramics were developed in Japan, possessing extremely high toughness and flexibility. These new materials were described as being durable in both acid and alkaline solutions by Abe, Y., et al. in "Calcium Phosphate Glass Ceramics for Biomedical and Biotechnological Applications," Asahi Glass Foundation for Industrial Technology, PB91-167056, PC A16/MF A02, (1990). In Canada, glass-ceramics based on partial crystallization of precursor glasses from the system $Na_2O$—$Al_2O_3$—CaO—$TiO_2$—$SiO_2$—X (where X is waste oxides or minor processing additives) were developed for the possible solidification of fuel recycle waste was described by Hayward, P. J. in "Review of Progress in the Development of Sphere-based Glass Ceramics," *Scientific Basis for Nuclear Waste Management*, IX Vol 50, Ed L. O. Werme (1986). Temperatures >1250° C. were required to create the glass; the ceramic phase was then recrystallized during sustained heating at 900°–1050° C. Similar results were obtained in the U.S. for $R_2O$—RO—$P_2O_5$ and $R_2O$—$Al_2O_3$—$P_2O_5$ glasses (where alkali metals are Na or Li, and alkaline earth metals are Ca or Ba) doped with 1 mol % of $TiO_2$, $ZrO_2$, $Y_2O_3$, $La_2O_3$, or $Ta_2O_5$. Glass-ceramics from the system $SiO_2$—$Cs_2O$—$Al_2O_3$—$(La, Ce)_2O_3$—$P_2O_5$—$Zr$ were described for high level waste immobilization at processing temperatures of <1600° C. in U.S. Pat. No. 4,314,909 to Beall, G. H., et al. While these glass-ceramics exhibit good chemical durabilities, high melting temperatures and associated losses of volatile fission products from the melts would restrict potential commercial use of these materials.

The glass compositions and vitrification process described above have many drawbacks. Processes relying on borosilicate glass formulations are incompatible with certain single-shell tank waste components, such as phosphates, calcium oxide and rare earth oxides (Wiemers, et al, PNL-7918 Report, p. 4.5). Moreover, borosilicate compositions require high-temperatures for processing which causes high loss of volatile hazardous metals requiring additional expensive off gas treatment. While lead-iron phosphate glasses appear to offer advantages of reduced process temperature and improved chemical durability compared with borosilicate glass, their lead content is considerable (40–60 wt %), posing the potential for excessive toxic releases from the glass matrix.

Accordingly, there is still a need in the art of waste disposal for a composition and method for encapsulation and immobilization of radioactive, hazardous and mixed wastes.

It is, therefore, an object of the present invention to provide a composition and process for permanent storage radioactive, hazardous and mixed wastes by encapsulation in low temperature, lead-free phosphate glass compositions. Another object of the present invention is to provide durable waste forms which can withstand delocalization by ecological forces. Another object of the present invention is to develop an encapsulating process which does not cause volatilization of hazardous material.

SUMMARY OF THE INVENTION

The present invention is a new family of lead-free glass compositions and methods for their use as matrixes to immobilize low level and/or high level radioactive wastes in monolithic waste forms. More specifically, the present invention provides lead-free glass compositions for encapsulation of radioactive, hazardous and mixed wastes which include from about 1 mole % to about 6 mole % iron III oxide, from about 1 mole % to about 6 mole % aluminum oxide, from about 15 mole % to about 20 mole % sodium oxide or potassium oxide, and from about 30 mole % to about 60 mole % phosphate. The foregoing compositions have been prepared at a temperature from about 850° C. to about 950° C. and preferably 900° C. and can be used with or without waste contained therein.

In another embodiment the lead-free glass compositions may also include glass modifiers such as, from about 15 mole % to about 20 mole % lithium oxide, from about 7 mole % to about 20 mole % calcium oxide and from about 7 mole % to about 15 mole % magnesium oxide.

Other lead-free glass compositions also provided by the present invention for encapsulation of radioactive, hazardous and mixed wastes include from about 3 mole % to about 6 mole % sodium oxide, from about 20 mole % to about 50 mole % tin oxide, from about 30 mole % to about 70 mole % phosphate, from about 3 mole % to about 6 mole % aluminum oxide, from about 3 mole % to about 8 mole % silicon oxide, from about 0.5 mole % to about 2 mole % iron (III) oxide and from about 3 mole % to about 6 mole % potassium oxide. This composition may also include up to 1.5 mole % calcium oxide and up to 0.5 mole % magnesium oxide. This lead-free glass composition have been prepared at a temperature from about 400° C. to about 450° C.

The present invention also provides lead-free glass ceramic composite for encapsulation of radioactive, hazardous and mixed wastes which include a glass coposition having from about 20 mole % to about 50 mole % tin oxide and from about 30 mole % to about 70 mole % phosphate and from about 0.5 weight % to 35 weight % fly ash.

As a result of the present invention, phosphate glass formulations are provided which are lead-free and may be made at low temperatures. The lead-free phosphate glass formulations of the present invention can be used to encapsulate and immobilize radioactive, hazardous and mixed wastes. The phosphate glass formulations of the present invention differ in type and quantity of network modifiers thereby resulting in glass matrices with improved chemical durability and reduced melting temperatures. The tin-phosphate glass composites of the present invention can be used as a host matrix for wastes containing low melting point or easily volatilized components which currently require secondary treatment under other vitrification processes. The leachability of the new phosphate glass formulations of the present invention are comparable to lead-iron-phosphate glasses and better than borosilicate nuclear waste glasses having the important advantage of preventing excessive toxic lead releases from the glass matrix.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

DETAILED DESCRIPTION OF THE INVENTION

The present invention provides a new family of lead-free phosphate glass compositions having reduced processing temperatures and improved chemical durability. Methods for their preparation are also provided. The new glass compositions were developed primarily for use in vitrifying radioactive, hazardous and mixed wastes but can be used in other industrial glass applications.

In one aspect of the present invention, the formulation of lead-free glass compositions is synthesized by admixing from about 1 mole percent to about 6 mole percent $Fe_2O_3$, from about 1 mole percent to about 6 mole percent $Al_2O_3$, from about 15 mole percent to about 20 mole percent $Na_2O$ and from about 30 mole percent to about 60 mole percent $P_2O_5$. The resulting admixture is then subjected to temperatures from about 850° C. to about 950° C. and preferably about 900° C.

In order to change viscosity, enhance durability and corrosion resistance, modifiers can be added to the glass formulations. Useful modifiers include from about 15 mole percent to about 20 mole percent potassium oxide, from about 15 mole percent to about 20 mole percent lithium oxide, from about 7 mole percent to about 20 mole percent calcium oxide and from about 7 mole percent to about 15 mole percent magnesium oxide.

In another aspect of the present invention, the formulation of lead-free glass compositions also includes tin oxide. More specifically, the glass compositions are obtained by admixing from about 3 mole percent to about 6 mole percent $Na_2O$, from about 20 mole percent to about 50 mole percent SnO, from about 30 mole percent to about 70 mole percent $P_2O_5$, from about 3 mole percent to about 6 mole percent $Al_2O_3$, from about 3 mole percent to about 8 mole percent $SiO_2$, from about 0.5 mole percent to about 2 mole percent $Fe_2O_3$ from about 3 mole percent to about 6 mole percent $K_2O$. Optionally, the tin oxide containing glass compositions can include from about 0 to about 1.5 mole percent CaO, from about 0 to about 0.5 mole percent MgO. The resulting admixture is then subjected to temperatures from about 400° C. to about 450° C.

In a preferred embodiment of the present invention, a lead-free glass-ceramic composite is provided by admixing a molten glass composition containing from about 2 mole percent to about 10 mole percent sodium oxide, from about 30 mole percent to about 60 mole percent tin oxide and from about 30 mole percent to about 70 mole percent phosphate and up to 35 weight percent fly ash waste which contains the remaining oxides listed above.

Once in molten state, the above glass compositions can be used to immobilize low-level and/or high-level radioactive wastes in monolithic waste forms. More specifically, the wastes can be added either as liquid, sludge or dry residue to the molten glass.

As used in the present invention radioactive waste refers to low level radioactive material as defined by Nuclear Regulatory Commission Regulations ("NRC") set forth in 10 CFR 61. Low level radioactive wastes do not include spent nuclear fuel, transuranic waste or byproduct materials which are defined as high-level radioactive wastes in §11 e(2) of the Atomic Energy Act of 1954 at 43 U.S.C. 2014(e). Low-level radioactive wastes ("LLW") include radioactive material found in evaporator concentrate, ion exchange resins, incinerator bottom ash, filtration sludges, and contaminated filters and membranes. Cs-137, Co-57 and Sb-125 are common radioactive constituents.

Hazardous waste refers to solid waste that may pose a substantial present or potential hazard to human health and the environment when improperly treated, stored, transported, disposed or otherwise managed as defined by §1004(5) of the Resource Conservation and Recovery Act as set forth at 40 CFR 261, EPA 55 Fed. Reg. 11862 (March 1990). Hazardous waste does not include low level radioactive waste. Hazardous materials include arsenic, lead, cadmium, mercury and other metals identified by EPA as toxic metals.

Mixed waste as used herein refers to waste which includes low level radioactive waste and hazardous waste. A more complete definition of mixed waste is set forth in a Memorandum of Understanding between the NRC and EPA and as published at 51 Fed. Reg. 24505 (Jul. 3, 1986). Mixed wastes include aqueous process streams, sludges, debris, and ash waste.

Waste types which may be encapsulated according to the encapsulation process of the present invention include incinerator blowdown solution, sludges, molten salt oxidation residues, ion exchange resins and municipal solid waste incinerator ash. Incinerator blowdown solution may include chloride salts, incinerator fly ash, toxic metals and radionuclides. Sludges treatable according to the process of the present invention include calcium and sodium carbonate, nitrates, EDTA chelating agent and toxic metals. Molten salt oxidation process residues include primarily calcium carbonate salts and miscellaneous fission products and toxic metals. Ion exchange resins are used to remove hazardous contaminants from process streams and can contain radionuclides and toxic metals.

The focus of the examples set forth below has been to provide crucible studies of the novel lead-free glass compositions and composites of the present invention. Two types of phosphate glass formulations were prepared: one based on iron-aluminum-phosphate system and the other based on tin-phosphate system. Modifying cations were added to each glass in order to improve chemical durability, stability and/or processability of the glass matrices. For example, modifying cations include oxides of lithium, sodium, potassium, calcium, and magnesium added or substituted in varying proportions to the iron-aluminum-phosphate glass. Silicon, sodium, potassium, iron and aluminum were used to modify the tin-phosphate system. The resulting glass compositions and composites were evaluated by using leaching tests and product consistency tests. Product consistency tests (PCT) are standard glass leaching tests developed by Westinghouse Savannah River Company, presently submitted as ASTM standard C26.13 as more specifically discussed by Jantzen, C. M., et al., in "Standard Test Methods for Determining Chemical Durability of Nuclear Waste Glassed: the Product Consistency Test (PCT)," version 6.0, Westinghouse Savannah River Co., Aiken, S.C., (April, 1993). In addition, x-ray defraction analysis (XRD) and scanning electromicroscopy (SEM) have been conducted to analyze the composition of the lead-free glasses and composites of the present invention.

EXAMPLES

The examples set forth below also serve to provide further appreciation of the invention but are not meant in any way to restrict the effective scope of the invention.

Example 1

In this example, glasses were prepared in small batches of reagent-grade oxide powders. The batches were from about 20 grams to about 50 grams. Raw chemicals were premixed in a rotating ball mill and then charged into 50 cc porcelain crucibles. The premixed powders were melted in a laboratory convection oven under atmospheric conditions. The resulting iron-aluminum-sodium-phosphate glasses had the following composition: 1–6 mole % $Fe_2O_3$; 1–6 mole %

$Al_2O_3$; 15–20 mole % $Na_2O$; and 30–60 mole percent $P_2O_5$. The glasses were then melted at temperatures of 900° C. from about 2 hours to about 4 hours.

Figure 1:
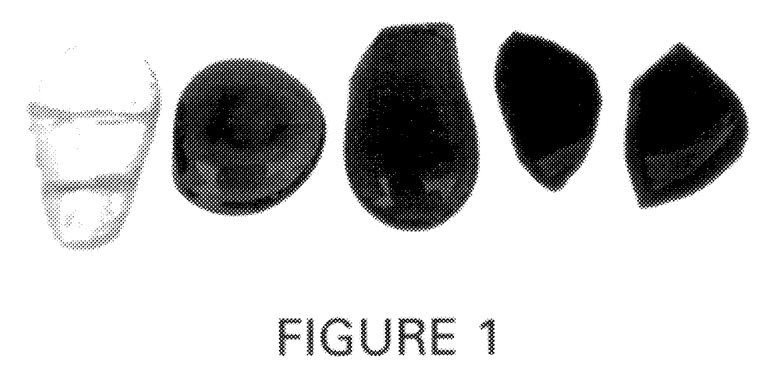
FIG. 1 illustrates various iron-aluminum-phosphate and tin-phosphate glasses.

Tin-phosphate glasses were prepared in the same manner and they had the following composition: 3–6 mole % $Na_2O$; 20–50 mole % SnO; 30–70 mole % $P_2O_5$; 3–6 mole % $Al_2O_3$; 3–8 mole % $SiO_2$; 0.5 –2 mole % $Fe_2O_3$; and 3–6 mole % $K_2O$. Tin-phosphate glasses were melted at 450° C. for from about 1 to about 2 hours. The resulting molten glasses were cast in stainless steel molds and allowed to cool to room temperature. Glass buttons were obtained which were, for the most part, clear with few seeds or air bubbles. The samples were not stirred during melting. As shown in FIG. 1 attached, colors ranged from light to dark brown for the iron-aluminum-sodium-phosphate glasses. The above samples were annealed at 150° C. for up to one month and showed no evidence of devitrification. These samples provide an excellent encapsulation medium for radioactive, hazardous and mixed wastes.

Example 2

Figure 2:
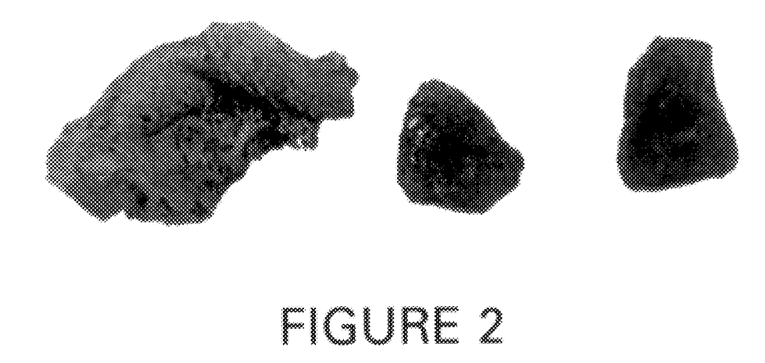
FIG. 2 illustrates tin-phosphate glass composites.

In this example, tin-phosphate glass composites containing additives were prepared in order to determine the capabilities of the low temperature glass as an encapsulation medium. The tin-phosphate glass composites were prepared in accordance with the procedure discussed in Example 1 above. The composites had the following formulation: 2–10 mole % $Na_2O$; 3–6 mole % $Al_2O_3$; 3–8 mole % $SiO_2$; 0.5–2 mole % $Fe_2O_3$; 3–6 mole % $K_2O$; 30–60 mole % SnO; and 30–70 mole % $P_2O_5$. Sodium, tin and phosphate oxides in the proportions shown above were mixed with 35 weight % fly ash waste which contained the remaining oxides listed above. The resulting glass-ceramics are shown in FIG. 2 attached. The colors ranged from light to dark gray and they were similar in appearance to glassy slags.

Figure 3:
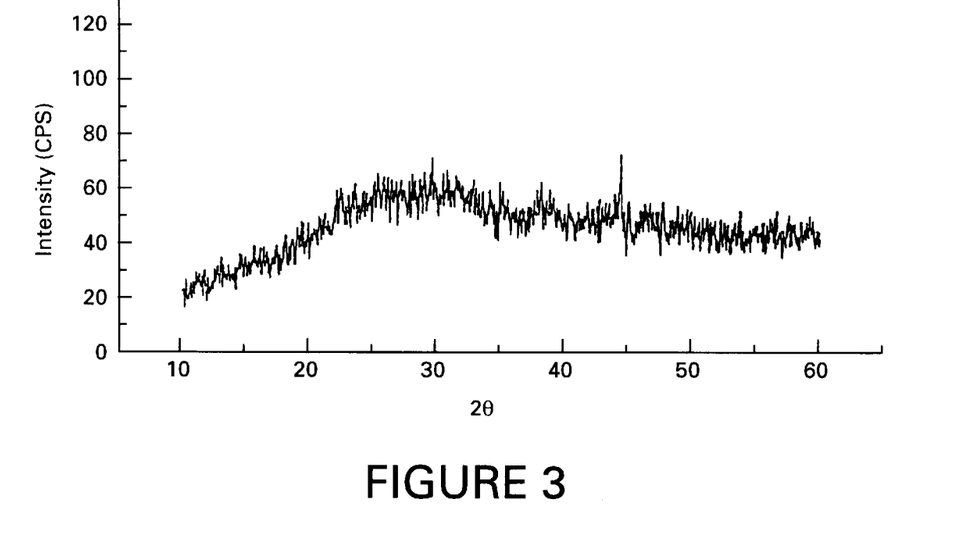
FIG. 3 is an X-Ray defraction pattern of iron-aluminum-phosphate glass.
Figure 4:
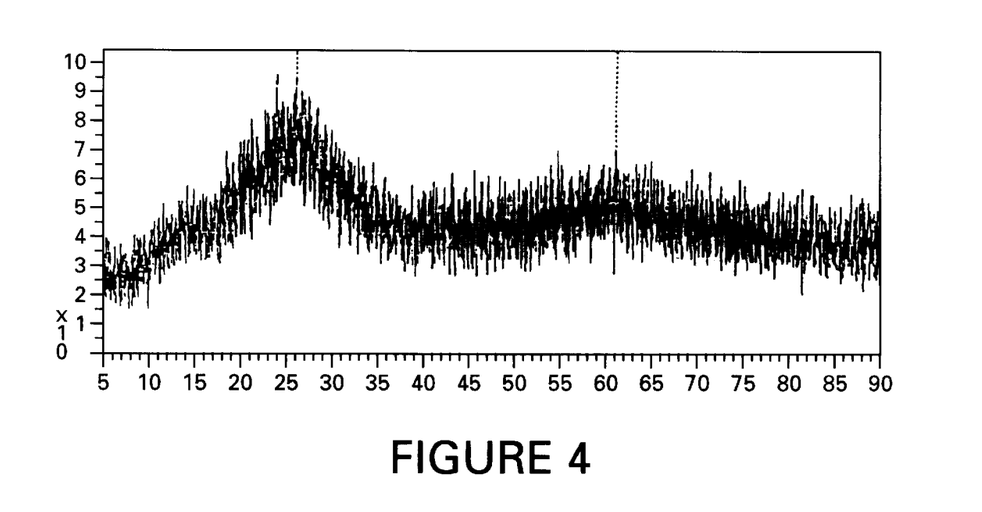
FIG. 4 is an X-Ray defraction pattern of tin-phosphate glass composite.

FIGS. 3 and 4 show XRD patterns typical of the synthesized glass and glass-ceramic materials. While the XRD patterns for iron-aluminum-phosphate glass were representative of amorphous materials, those taken from powdered tin-phosphate glass composite indicated the presence of crystalline fly ash waste bonded or encapsulated within the glass matrix. These samples have been prepared at low temperatures of about 400° C.–450° C. and have provided an excellent medium for incorporation of fly ash.

Example 3

In this example, glass samples obtained in Examples 1 and 2 were comminuted to the −100 to +200 mesh size range as required for the PCT procedure desribed in Jantzen, C.

M., et al., supra at pp 8–9. Large pieces were crushed inside a polyethylene bag by carefully striking with a hammer. Fines were further ground using a porcelain mortar and pestle. Powders were sieved through stainless steel sieves. Screens were cleaned and dried between batches in order to prevent cross contamination of the glasses. The density of glass samples was measured by using Quantachrome pycnometer. Density data is required to calculate glass surface area for the PCT procedure. The samples were measured both as chunks or buttons and also as crushed glass powders. Surface areas for each glass were calculated by using the equation in Appendix I of the PCT test method as discussed in Jantzen, C. M., et al. supra.

PCT testing was carried out by using teflon perfluoralkoxy vessels. Because the intended use for the glass was as host with mixed rather than high-level radioactive waste, baseline leach tests were conducted at ambient temperature according to test method B rather than at 90° C. as specified by method A for high-level radioactive waste forms. However, in order to provide a comparison with baseline borosilicate leach test results, two leach tests were conducted at 90° C. on iron-aluminum-phosphate glasses. These glasses had the following composition: BNL-13 contained about 15 mole % $Na_2O$, about 10 mole % $Li_2O$, about 12 mole % CaO, about 12 mole % MgO, about 4 mole % $Fe_2O_3$, about 3 mole % $Al_2O$, and about 44 mole % $P_2O_5$; BNL-14 contained about 15 mole % $Na_2O$, about 10 mole % $K_2O$, about 12 mole % CaO, about 12 mole % MgO about 3.5 mole % $Fe_2O_3$, about 3 mole % $Al_2O_3$ and about 44.5 mole % $P_2O_5$. The leach tests were conducted in purified water (ASTM Type I) in a volume which had 10 times the mass of the glass sample for a period of about 7 days. Weights of the glass samples tested range from about 0.38 to about 1.17 grams. All tests were done in triplicate. On completion of the leach test, leachates were analyzed by inductively coupled plasma (ICP) spectroscopy for matrix cations. The chemistry of the parent glasses were determined by totally digesting the reference glasses in aqua regia and hydrochloric acid and analyzing by ICP for matrix components.

Leach rates of the dissolved metals were calculated as mass of metal leach (per gram of glass sample) divided by surface area (per gram of glass) and leach time. The data was normalized by dividing the original amount of each element present in the glass, as determined by digestion of the parent glass. The leach data for all iron-aluminum-phosphate glasses is shown in Table 1 below. The leach data for tin-phosphate glass composites is shown in Table 2 below.

TABLE 1

PCT Leach Results for $Fe_2O_3$—$Al_2O_3$—$P_2O_5$ Glasses.

Normalized Leach Rate, $g/m^2/d^a$

|  | Li | Na | K | Mg | Ca | Fe | B | Al | P |
| --- | --- | --- | --- | --- | --- | --- | --- | --- | --- |
| BNL-10 | 1.74E-02 | $NA^b$ | 1.72E-02 | 1.71E-02 | 1.41E-02 | 1.25E-02 | NA | 2.02E-02 | 1.69E-02 |
|  | (9.92E-05) |  | (1.98E-04) | (3.73E-04) | (1.88E-04) | (8.09E-05) |  | (2.34E-04) | (1.65E-04) |
| BNL-11 | 1.88E-02 | NA | 1.77E-02 | 1.69E-02 | 1.18E-02 | 1.18E-02 | NA | 1.49E-02 | 1.68E-02 |
|  | (6.41E-04) |  | (8.35E-04) | (3.84E-04) | (1.16E-03) | (5.11E-04) |  | (5.67E-04) | (3.02E-04) |
| $BNL14^c$ | 4.38E-02 | NA | 3.08E-02 | 9.04E-03 | 1.30E-03 | 1.07E-03 | NA | 1.45E-03 | 2.16E-02 |
|  | (8.44E-04) |  | (1.14E-03) | (5.89E-04) | (3.42E-04) | (1.83E-05) |  | (7.45E-05) | (1.09E-04) |

TABLE 1-continued

PCT Leach Results for Fe$_2$O$_3$—Al$_2$O$_3$—P$_2$O$_5$ Glasses.

Normalized Leach Rate, g/m$^2$/d[a]

| | Li | Na | K | Mg | Ca | Fe | B | Al | P |
|---|---|---|---|---|---|---|---|---|---|
| BNL-8 | 8.43E-02 | 8.36E-02 | NA | 8.07E-02 | 9.64E-01 | 8.40E-02 | NA | 5.56E-02 | 8.74E-02 |
| | (3.83E-03) | (4.97E-03) | | (5.89E-03) | (4.34E-01) | (3.48E-03) | | (3.97E-02) | (3.34E-03) |
| BNL-9 | 2.15E-02 | 2.20E-02 | NA | 2.16E-02 | 1.79E-02 | 2.07E-02 | NA | 2.41E-02 | 2.23E-02 |
| | (2.53E-04) | (4.37E-04) | | (3.28E-04) | (1.08E-03) | (3.64E-04) | | (5.60E-04) | (7.29E-04) |
| BNL-5 | 8.25E-03 | 6.93E-03 | NA | 2.62E-03 | 9.35E-04 | 3.05E-03 | NA | 2.47E-03 | 6.30E-03 |
| | (1.27E-04) | (3.50E-04) | | (1.28E-04) | (4.91E-05) | (1.05E-04) | | (4.58E-04) | (5.98E-04) |
| BNL-13[c] | 2.27E-02 | 9.82E-03 | NA | 2.43E-03 | 5.40E-04 | 4.31E-06 | NA | 2.53E-03 | 9.34E-03 |
| | (1.97E-04) | (6.61E-05) | | (6.23E-04) | (1.67E-04) | (1.21E-05) | | (2.00E-03) | (3.42E-04) |

[a]Leach data are the mean of 3 replicates; standard deviation shown in parenthesis.
[b]NA = not applicable (this metal not included in this formulation).
[c]Leach test conducted at 90° C.

TABLE 2

PCT Leach Results for Sn—P$_2$O$_5$ Glass-Composites.
Normalized Leach Rate, g/m$^2$/d

| | Na | K | Fe | Al | Si | Sn | P |
|---|---|---|---|---|---|---|---|
| BNL-6 | 3.93E-02 | NA[b] | 1.99E-02 | 7.33E-03 | ND[c] | 6.78E-02 | 8.63E-02 |
| | (4.74E-03) | | (1.35E-03) | (2.74E-04) | | (5.51E-03) | (7.58E-03) |
| BNL-12 | NA | 7.28E-02 | 1.75E-02 | 1.46E-02 | 3.47E-03 | 9.59E-02 | 9.00E-02 |
| | | (9.09E-04) | (8.23E-05) | (3.19E-04) | (5.66E-05) | (1.24E-03) | (2.02E-04) |

[a]Leach data are the mean of 3 replicates; standard deviation shown in parenthesis.
[b]NA = not applicable (this metal not included in this formulation).
[c]ND = not detected.

Mean and standard deviation, as shown in parenthesis, of three replicate tests are reported in the tables for each glass composition. Samples BNL-5, BNL-8, BNL-9 and BNL-13 are similar in that the glasses each contain about 15 mole % Na$_2$O, about 10 mole % Li$_2$O, about 12 mole % CaO, and about 12 mole % MgO, with variable amounts of Fe$_2$O$_3$ from about 1.5% mole to about 4 mole %, Al$_2$O$_3$ from about 1.5% mole to about 3 mole %, and P$_2$O$_5$ from about 44 to about 48 mole %. Samples BNL-10, BNL-11, and BNL-14 each contain about 15 mole % K$_2$O, about 10 mole % Li$_2$O, about 12 mole % CaO, and about 12 mole % MgO, with variable amounts of Fe$_2$O$_3$ from about 1.5 mole % to about 4 mole %, Al$_2$O$_3$ from about 1.5 mole % to about 3 mole %, and P$_2$O$_5$ from about 44 % mole to about 48 mole %. Samples BNL-6 and BNL-12 are composites of approximately 35 wt % flyash encapsulated in a tin-phosphate glass matrix. These composites normally contain from about 2 mole % to about 10 mole %, Na$_2$O, from about 3 mole % to about 6 mole % K$_2$O, from about 3 mole % to about 8 mole % SiO$_2$, from about 0.5 mole % to about 2 mole % Fe$_2$O$_3$, from about 3 mole % to about 6 mole % Al$_2$O$_3$, from about 30 mole % to about 60 mole % SnO, and from about 30 mole % to about 70 mole % P$_2$O$_5$ although composition can vary depending on composition and quantity of flyash encapsulated in the composite. The glasses set forth in the tables have been arranged with increasing modifier (Fe/Al) content. Leach test blanks, i.e., containing no glass samples were included with each series of tests. The blanks showed no detectable metals present after a 7-day period. The above results indicate that PCT leachability of glass matrix components can be improved by up to a factor of 10 through proper selection of cation modifiers.

Figure 5:
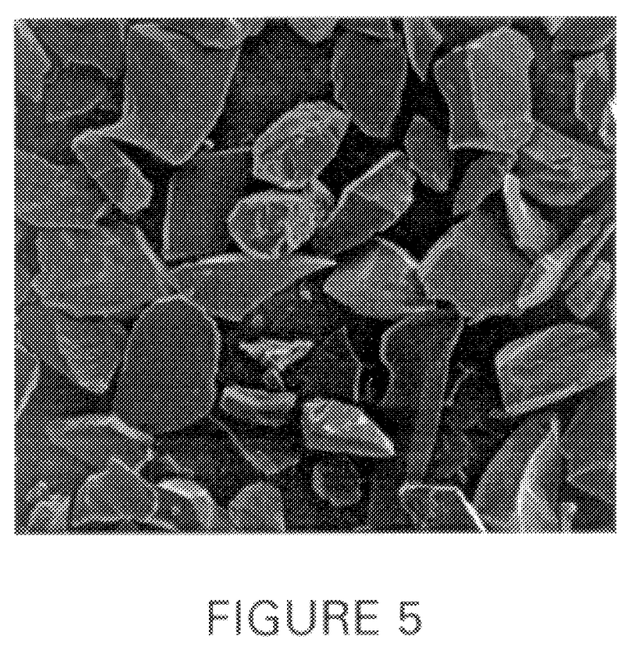
FIG. 5 is a scanning electron micrograph of glass Fe—Al—$P_2O_5$ powder before product consistency tests (PCT) having 100 fold magnification.
Figure 6:
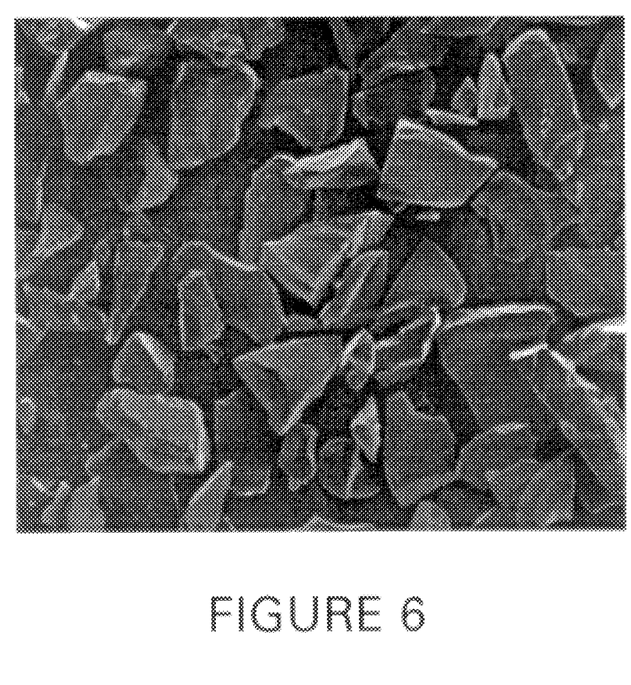
FIG. 6 is a scanning electron micrograph of the same glass powder as in FIG. 5 taken after product consistency tests having 100 fold magnification.
Figure 7:
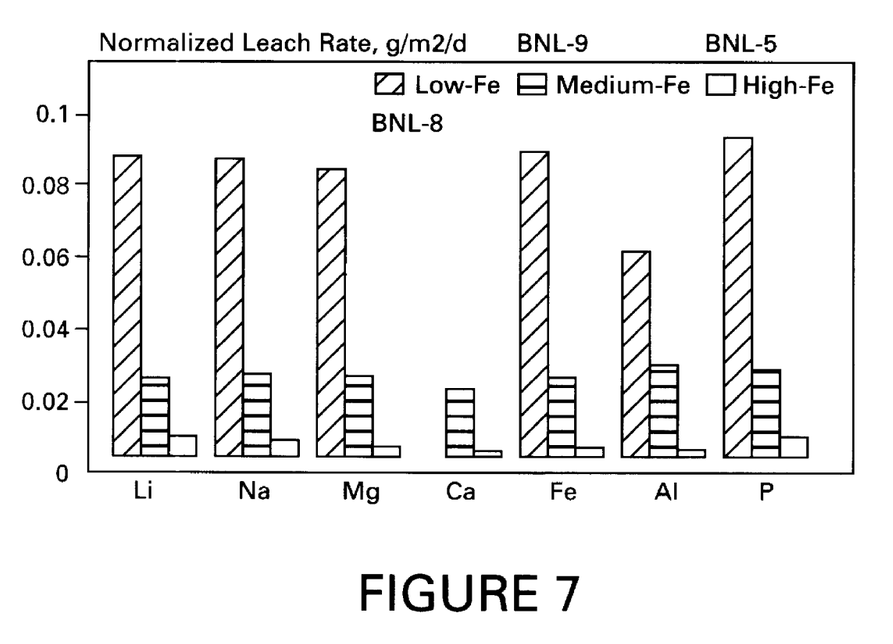
FIG. 7 shows leach results for potassium-free iron-aluminum-phosphate glasses of samples BNL 8 (low Fe concentration) BNL 9 (medium Fe concentration), and BNL 5 (high Fe concentration) at 25° C.
Figure 8:
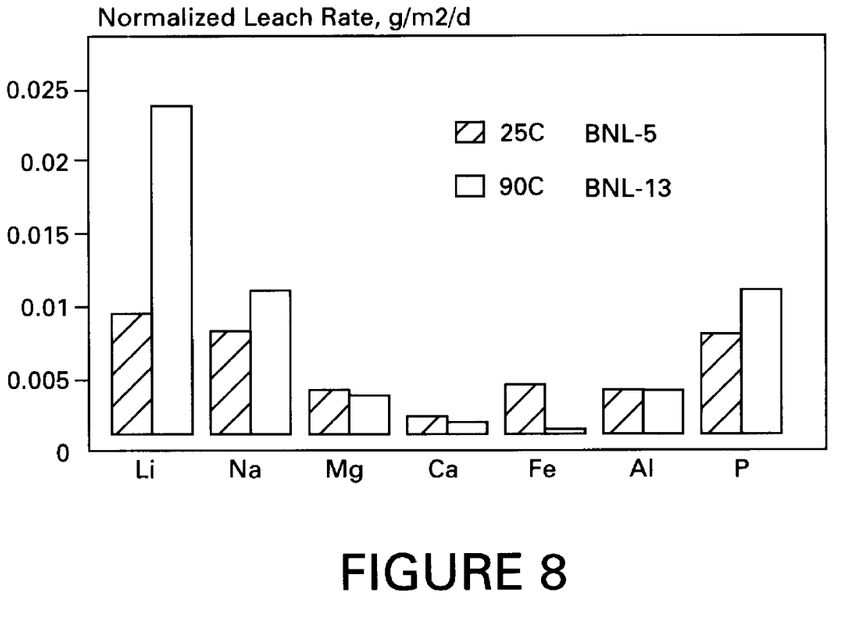
FIG. 8 shows a comparison of PCT leach results for iron-aluminum-phosphate glasses taken for BNL 5 at 25° C. and BNL 13 at 90° C.

SEM microscopy was conducted on post-leach test glass powders of samples BNL 13, BNL 14 to look for evidence of corrosion. As shown in FIGS. 5 and 6, the leached samples were indistinguishable from the untested samples. The corrosion rate was reduced with increasing additions of Fe, as depicted in FIG. 7. The PCT leach results conducted at 90° C. were virtually identical to tests conducted at room temperature. A direct comparison can be made between the leach test results for sample BNL- 13 which were taken at 90° C. and those conducted on BNL-5 at room temperature. As previously noted, BNL-5 and BNL- 13 have the same composition, namely about 15 mole % Na$_2$O, about 10 mole % Li$_2$O, about 12 mole % CaO, about 12 mole % MgO, from about 15 to about 4 mole % F$_2$O$_3$, from about 1.5 to about 3 mole % Al$_2$O$_3$, about 44 mole % P$_2$O$_5$. A metal-by-metal comparison for these tests is shown in FIG. 8. The higher leach temperature yielded slightly higher releases for alkali metals and phosphorous, and slightly lower releases for the other metals present. Although formulations have not been optimized, the lowest leachability of the formulations tested was achieved in glasses containing sodium, as opposed to those containing potassium. Alkali and alkaline earth metals made up a significant fraction of these glasses, indicating their capacity to incorporate and retain significant salt contaminants likely to be found in the Tank Waste Remediation System (TWRS), a permanent storage of nuclear waste facility found at Hanford, Washington State.

Leach rates for tin-phosphate composites were only slightly higher than those obtained for the best Fe$_2$O$_3$—Al$_2$O$_3$—P$_2$O$_5$ formulations. XRD data on these composites indicates that the glassy matrix was retained. Chemical constituents in the dry surrogate waste, namely Ca, Al, and Si, were compatible with the low temperature glass.

PCT data for both iron-aluminum-phosphate and tin-phosphate matrices compared favorably with lead-iron-phosphate glasses and reference borosilicate high-level waste glasses. Sales and Boatner quote leach rates of 0.73–1.25, 0.93–2.30, and 0.99–2.00 g/m$^2$/d, for Si, B, and Na, respectively, from borosilicate defense and commercial waste glasses in "Physical and Chemical Characteristics of Lead-Iron Phosphate Nuclear Waste Glasses," Journal of Non-Crystalline Solids, vol. 79, pp 84–116 (1986). Comparable leach results from lead-iron-phosphate waste glasses were <0.006, <0.001, <0.02, and <0.02 g/m$^2$/d, for P, Fe, Al and Na. These results are for leach tests done in distilled water at pH 7, 90° C. for 30 days.

Thus, while there have been described what are presently believed to be the preferred embodiments of the present invention, those skilled in the art will appreciate that other and further modifications can be made without departing from the true scope of the invention, and it is intended to include all such modifications and changes as come within the scope of the claims as appended herein.

What is claimed is:

1. A lead-free glass composition which consists essentially of from about 1 mole % to about 6 mole % iron (III) oxide, from about 1 mole % to about 6 mole % aluminum oxide, from about 15 mole % to about 20 mole % sodium oxide or potassium oxide, from about 30 mole % to about 60 mole % phosphorous pentoxide, wherein said lead-free glass composition has a melting temperature from about 850° C. to about 950° C., whereby a glass composition of sufficient chemical durability is obtained for encapsulation of radioactive, hazardous and mixed wastes.

2. The lead-free glass composition of claim 1, further consisting essentially of from about 15 mole % to about 20 mole % lithium oxide, from about 7 mole % to about 20 mole % calcium oxide and from about 7 mole % to about 15 mole % magnesium oxide.

3. The lead-free glass composition of claim 1 having a melt temperature of about 900° C.

* * * * *